United States Patent
Ng et al.

(10) Patent No.: US 7,359,968 B1
(45) Date of Patent: Apr. 15, 2008

(54) PSEUDO-RANDOM N-OUT-OF-N PACKET SAMPLING

(75) Inventors: Daniel Yu-Kwong Ng, San Jose, CA (US); Simon Wai-Ming Hsu, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 697 days.

(21) Appl. No.: 10/763,584

(22) Filed: Jan. 23, 2004

(51) Int. Cl.
*G06F 15/173* (2006.01)

(52) U.S. Cl. .................... 709/224; 370/352; 370/329

(58) Field of Classification Search ............. 709/224; 370/229, 252

See application file for complete search history.

(56) References Cited

U.S. PATENT DOCUMENTS

| 3,761,696 | A | * | 9/1973 | Russell | 708/252 |
| 4,472,784 | A | * | 9/1984 | Blachman | 702/83 |
| 6,873,600 | B1 | * | 3/2005 | Duffield et al. | 370/252 |

* cited by examiner

*Primary Examiner*—Ario Etienne
*Assistant Examiner*—Uzma Alam
(74) *Attorney, Agent, or Firm*—Stolowitz Ford Cowger LLP

(57) ABSTRACT

A method for sampling n-out-of-N packets in a network. Initially, the packet index corresponding to the N packets is pseudo-randomly shuffled. The shuffle function rearranges a set of numbers pseudo-randomly with a one-to-one mapping and no overlap. One way to perform the pseudo-random shuffle function is to use a linear feedback shift register (LFSR). The LFSR supports N being a power of two. However, the LFSR approach can be adapted to support N being any positive integer value. Based on the results of the shuffle function, sampling points are pseudo-randomly selected. By pseudo-randomly selecting the sample points, n-out-of-N sampling greatly minimizes biases.

13 Claims, 11 Drawing Sheets

PSEUDO-RANDOM N-OUT-OF-N PACKET SAMPLING

FIELD OF THE INVENTION

The present invention relates to an apparatus and method for pseudo-random sampling n-out-of N packets in a packet-based network.

BACKGROUND OF THE INVENTION

Businesses and individuals rely upon networks (e.g., the Internet) for communications and the exchange of data. Computers coupled to these networks allow users to readily gain access to and exchange data of all types (e.g., sound, text, numerical data, video, graphics, multi-media, etc.) with other computers, databases, websites, etc. This enables users to send and receive electronic mail (e-mail) messages, browse web sites, download files, participate in live discussions in chat rooms, play games in real-time, watch streaming video, listen to music, shop and trade on-line, etc. With increased network bandwidth, video-on-demand, HDTV, IP telephony, video teleconferencing, and other types of bandwidth intensive applications will become prevalent.

But in each of these applications, the underlying technology is basically the same. The data is first broken up into several smaller "packets." The data packets are then individually routed through one or more networks via a number of interconnected network devices. The network devices, such as routers, hubs, and/or switches, direct the flow of these data packets through the network to their intended destinations. And depending on the degree of complexity, one or more dedicated network administrators use specialized network management systems to provision, troubleshoot, monitor, profile, and otherwise keep the network operating at peak efficiency.

Ideally, the exact network conditions can be evaluated by examining the packets as they are being routed through the network. These packets give invaluable information which is essential in analyzing network performance. Unfortunately, monitoring and examining each and every packet is quite costly. Resources must be dedicated for metering, storing, transporting, and processing the data. Furthermore, some network management techniques require the capturing of packet headers or even parts of the attendant payload. And as network speed and bandwidth continue to increase, the amount of data being carried over the networks threatens to overwhelm even the most sophisticated network management system.

In an effort to minimize the costs and overhead associated with network management, while at the same time, preserving measurement accuracy, many network management systems have adopted sampling techniques. Rather than examine each and every packet being carried over the network, a small set of selected packets are captured, examined, and analyzed; the vast majority of packets are not examined. The rationale is that the smaller set of "sampled" packets are representative of the overall network traffic. One can deduce and extrapolate the general network conditions by evaluating the small set of sampled packets. In a way, "sampling" used in the context of network management applications is analogous to conducting "surveys" or taking "polls."

One popular sampling technique is known as "n-out-of-N." In an n-out-of-N packet sampling scheme, "n" elements are selected out of a parent population that consists of "N" elements. Applied to network management systems, a smaller set of "n" packets are sampled from a given, larger set of "N" packets. Unfortunately, systematically selecting "n" numbers of consecutive packets with a count period of "N" may generate biased results. Under some circumstances, systematic n-out-of-N might not catch unusual network activity, especially if the anomaly is periodic or quasi-periodic and happens to fall outside the sampling window. One way to minimize biasing the results, entails randomly selecting the position of the first packet to be sampled. Although this reduces the probability of biasing, it does not completely resolve the biasing problem. For example, a hacker may take advantage of known sampling schemes and design algorithms to exploit or otherwise circumvent the sampling being conducted. Thus, there exists a need for a sampling scheme which minimizes biasing, retains accuracy, and yet, is cost effective.

SUMMARY OF THE INVENTION

The present invention pertains to a method and apparatus for n-out-of-N sampling. A shuffle function is used to rearrange a set of numbers pseudo-randomly with a one-to-one mapping and no overlap. One way to perform the pseudo-random shuffle function is to use a linear feedback shift register. Based on the results of the shuffle function, each of the sampling points are pseudo-randomly selected. By pseudo-randomly selecting the sample points for n-out-of-N sampling, biasing is greatly minimized.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
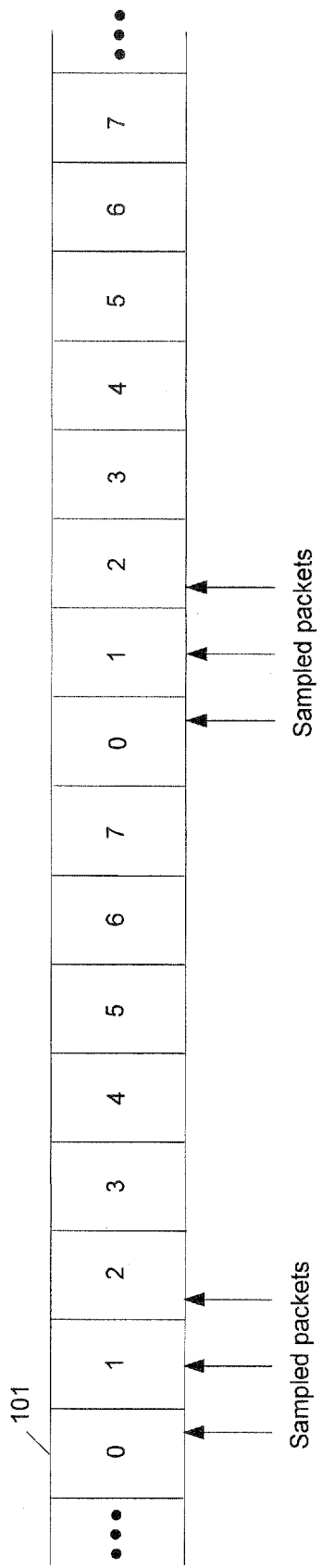
FIG. 1 shows a conventional systematic n-out-of-N sampling scheme.

A pseudo random n-out-of-N sampling scheme is disclosed. As an aid to understanding the present invention, a prior art systematic n-out-of-N is depicted in FIG. 1. In a prior art systematic n-out-of-N sampling scheme, n number of consecutive packets are sampled from a sample size of N number of packets. By way of example, a stream of packets is shown as 101, and three packets are sampled from every eight packets. In other words, n=3 and N=8. Consequently, packet0, packet1, and packet2 . . . packet0, packet1, and packet2 . . . packet0, packet1, and packet2 . . . etc., are continuously sampled and then analyzed for purposes of network management.

Figure 2:
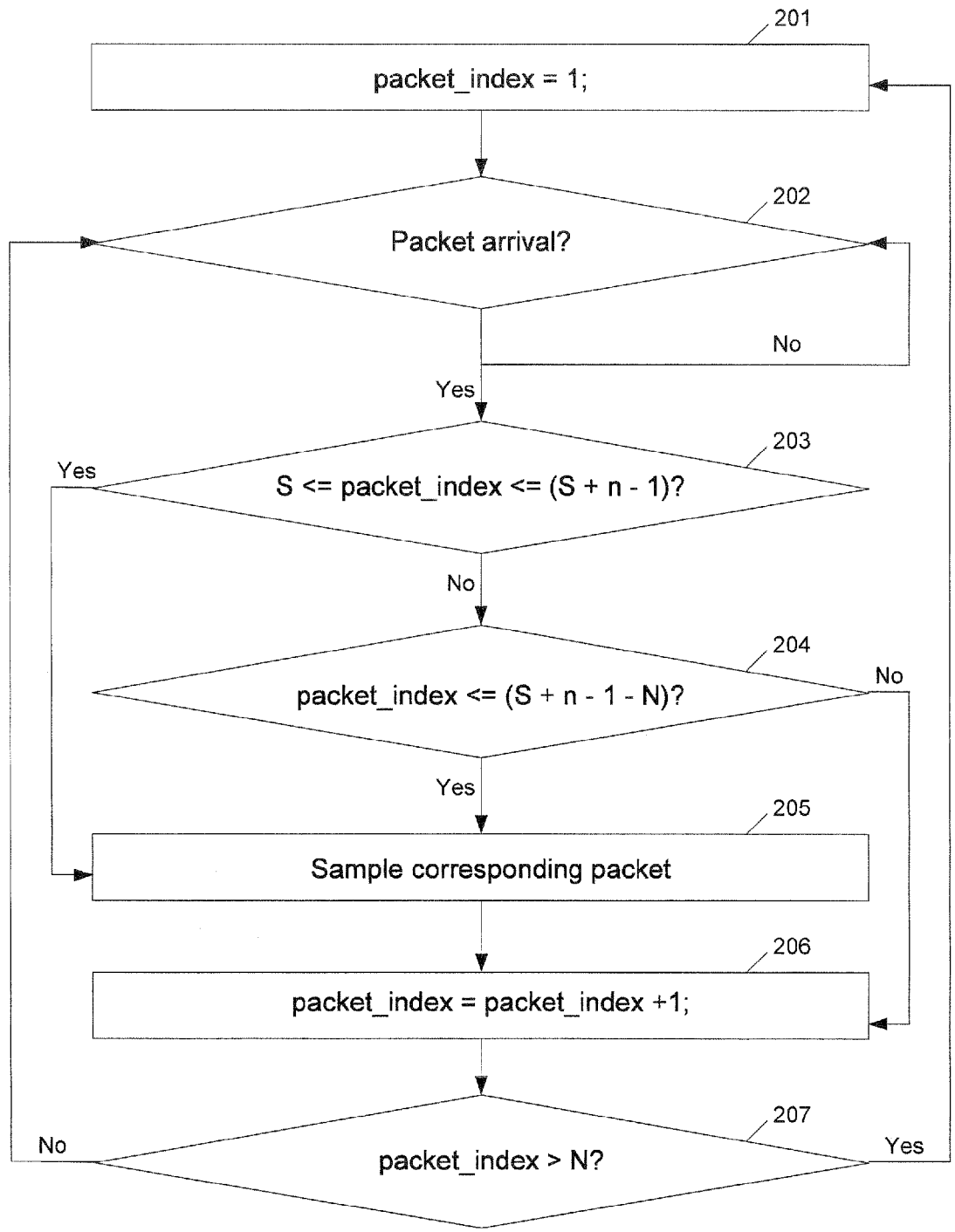
FIG. 2 shows a flowchart depicting the process for a prior art systematic n-out-of-N sampling.

FIG. 2 shows a flowchart depicting the process for a prior art systematic n-out-of-N sampling. A user first sets n, N and S values, where n packets are to be sampled out of every N packets. The variable S specifies the sampling points (i.e., sample (S)th packet to (S+n−1)th packet every N packets). If the number of packets between (S)th packet and (N)th packet is fewer than n, the first (S+n−1−N) packet(s) of every N packets is also sampled. After the user sets n, N and S values, the sampling process begins. The process can be done by either hardware or software. In step 201a packet_index is initially set to 1. The two diamond decision blocks 203 and 204 following the packet arrival diamond 202, determine the sampling points. More specifically, decision block 203 determines whether S<=packet_index<=(S+N−1). If it is true, then step 205 is executed and that corresponding packet is sampled. Otherwise, decision block 204 determines whether the packet_index<=(S+n−1−N). If the condition is true, step 205 specifies that the corresponding packet be sampled. If neither of the two decision blocks 203 and 204 are met, then the corresponding packet is not sampled. Whether the packet is sampled or not, the packet_index is incremented by one according to step 206. A final decision block 207 determines whether the packet_index is greater than N. If the packet_index is greater than N, the packet_index is reset back to 1 and the process begins again at step 201. Otherwise, the process repeats at step 202.

Figure 3:
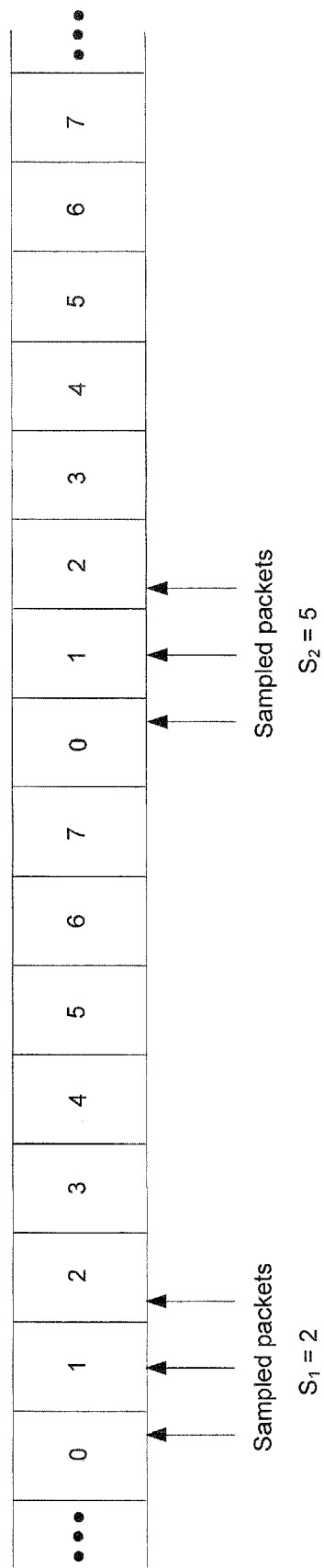
FIG. 3 shows a packet sampling scheme whereby the first packet to be sampled is randomly selected.

A more sophisticated and less biased sampling scheme entails randomly picking the location of the first packet to be sampled. FIG. 3 shows a packet sampling scheme whereby the first packet to be sampled is randomly selected. A random number generator is used to generate random numbers whereby the random number, S, is less than or equal to the sample size N. The random number generator produces a random number S at the beginning of every N packets. Following the same example given above where n=3 and N=8, suppose that the random number generator produces two random numbers 2 and 5 (e.g., $S_1$=2 and $S_2$=5). Given these parameters, packet1, packet2, and packet3 would be sampled for $N_1$; whereas packet4, packet5, and packet6 would be sampled for $N_2$.

Figure 4:
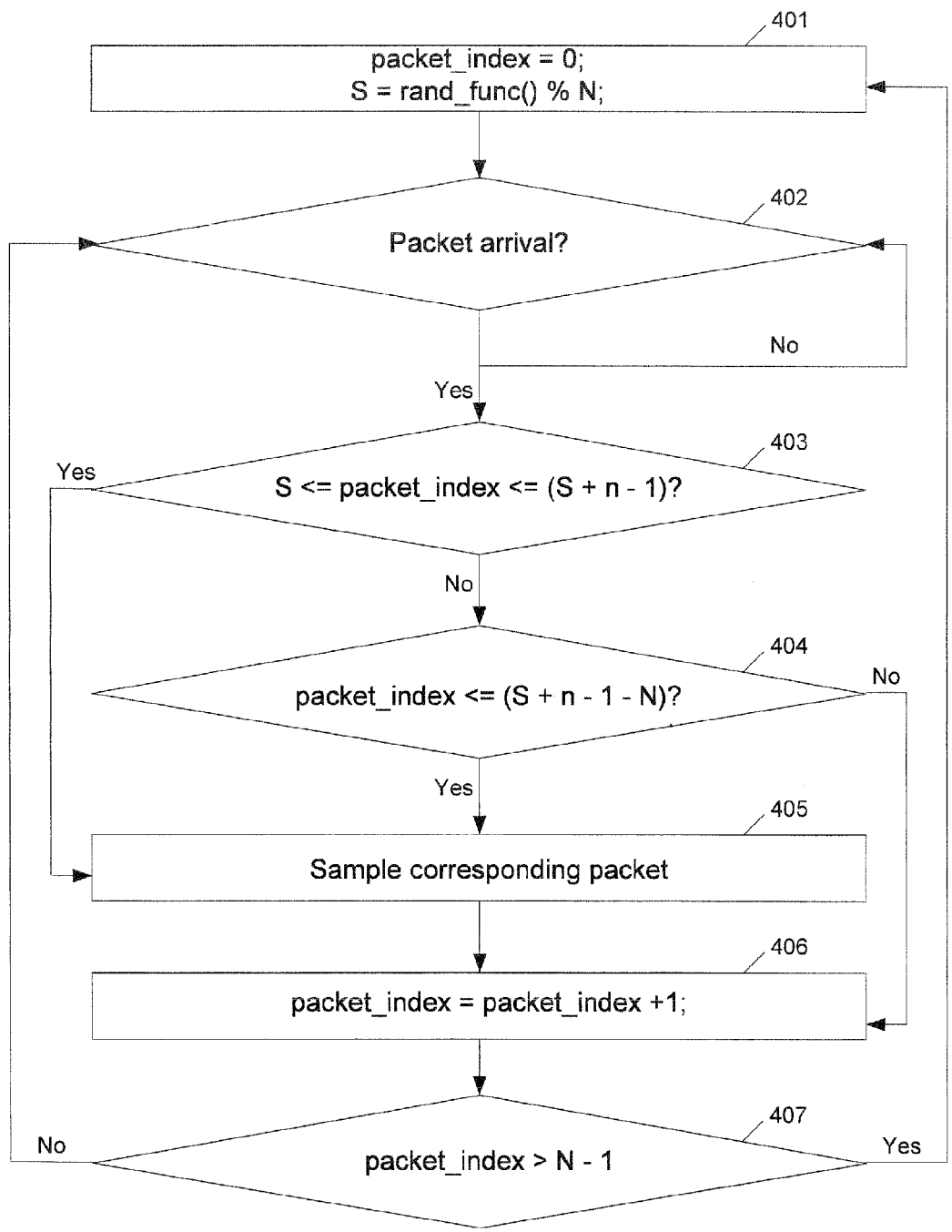
FIG. 4 is a flowchart showing the process for a packet sampling scheme whereby the first packet to be sampled is randomly selected.

FIG. 4 is a flowchart showing the process for a packet sampling scheme whereby the first packet to be sampled is randomly selected. In this method, the packet_index is set to 0 and S is set randomly at the beginning of every N packets, as shown in step 401. A function, rand_func( ) % N, returns an evenly distributed random integer number between 0 and N−1 (i.e., 0<=rand_func( ) % N<=N−1). Steps 402-406 are equivalent to steps 202-206 described above. Because packet_index is initially set to 0, step 407 determines whether the packet_index>N−1.

Figure 5:
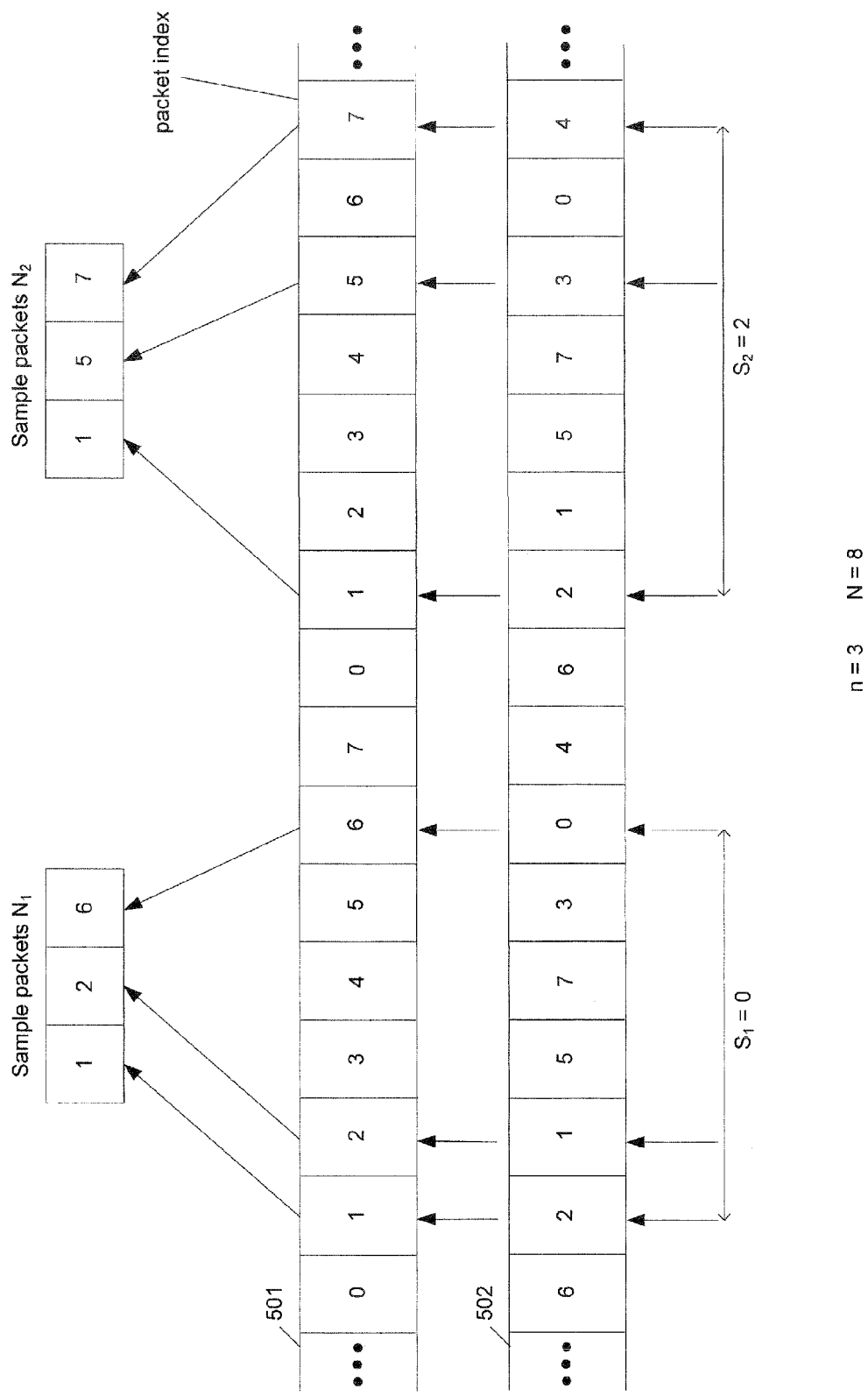
FIG. 5 shows an improved pseudo-random n-out-of-N sampling scheme in accordance with one embodiment of the present invention for a pseudo-random n-out-of-N sampling scheme.

An improved pseudo-random n-out-of-N sampling scheme in accordance with one embodiment of the present invention for a pseudo-random n-out-of-N sampling scheme is shown in FIG. 5. In a preferred embodiment of the present invention, the positions of each of the arbitrary n number of packets are randomly selected from any given N sample size. A shuffle function is used to rearrange a set of numbers pseudo-randomly with a one-to-one mapping and no overlap. A standard sequence of packet_index where N=8 is shown as 501. The standard packet_index sequence is randomly shuffled. One example of the randomly shuffled packet_index sequence is shown as 502. In this example, the standard packet_index sequence of 0, 1, 2, 3, 4, 5, 6, 7 now becomes 6, 2, 1, 5, 7, 3, 0, 4 after it is randomly shuffled. Before each N packets, a random number S is generated, where S is smaller than or equal to N. The random number S is used to determine which of the packets with randomly shuffled packet_index is to be selected for sampling. A packet is sampled if the randomly shuffled packet_index is greater than or equal to S and also less than or equal to S+n−1. In other words, a packet is sampled if it meets the following equation:

S<=randomly shuffled packet_index <=S+n−1

In the example shown, suppose that the first random number is zero (e.g., $S_1$=0). This would mean that S=0; and S+n−1=0+3−1=2. Consequently, only 0, 1, 2 of the randomly shuffled packet_index sequence 502 would be selected since 0 <=0<=2; 0 <=1<=2; and 0<=2<=2. Randomly shuffled packet_index 0 corresponds the seventh packet (i.e., 6 of the standard packet_index sequence 501). Randomly shuffled packet_index 1 corresponds to the third packet(i.e., 2 of the standard packet_index sequence 501). And randomly shuffled packet_index 2 corresponds to the second packet (i.e., 1 of the standard packet_index sequence 501). Consequently, for S=0, the packets selected for sampling would be second, third and the seventh packets.

Now suppose that for the next set of N=8 packets, the random number generator produces the number two (e.g., $S_2$=2). This would mean that S=2; and S+n−1=2+3−1=4. Consequently, only 2, 3, 4 of the randomly shuffled packet_index sequence 502 would be selected since 2<=2<=4; 2<=3<=4; and 2<=4<=4. Randomly shuffled packet_index 2 corresponds the second packet (i.e., 1 of the standard packet_index sequence 501). Randomly shuffled packet_index 3 corresponds to the sixth packet(i.e., 5 of the standard packet_index sequence 501). And randomly shuffled packet_index 4 corresponds to the eighth packet (i.e., 7 of the standard packet_index sequence 501). Consequently, for S2=2, the packets selected for sampling would be second, sixth and eighth packets.

There is one case which should be covered, and it relates to wrap around conditions. If the random number S is towards the end of the N packets, it may be that there are not enough remaining packets left for the designated n packets to be sampled. In other words, a wrap around condition exists if n>N−S+1. To handle such wrap around conditions, a second criteria is established. For a packet to be sampled, it must satisfy either the first criteria given above (i.e., S<=randomly shuffled packet_index <=S+n−1) or meet the following wrap around criteria:

randomly shuffled packet_index <=S+n−1−N

Figure 6:
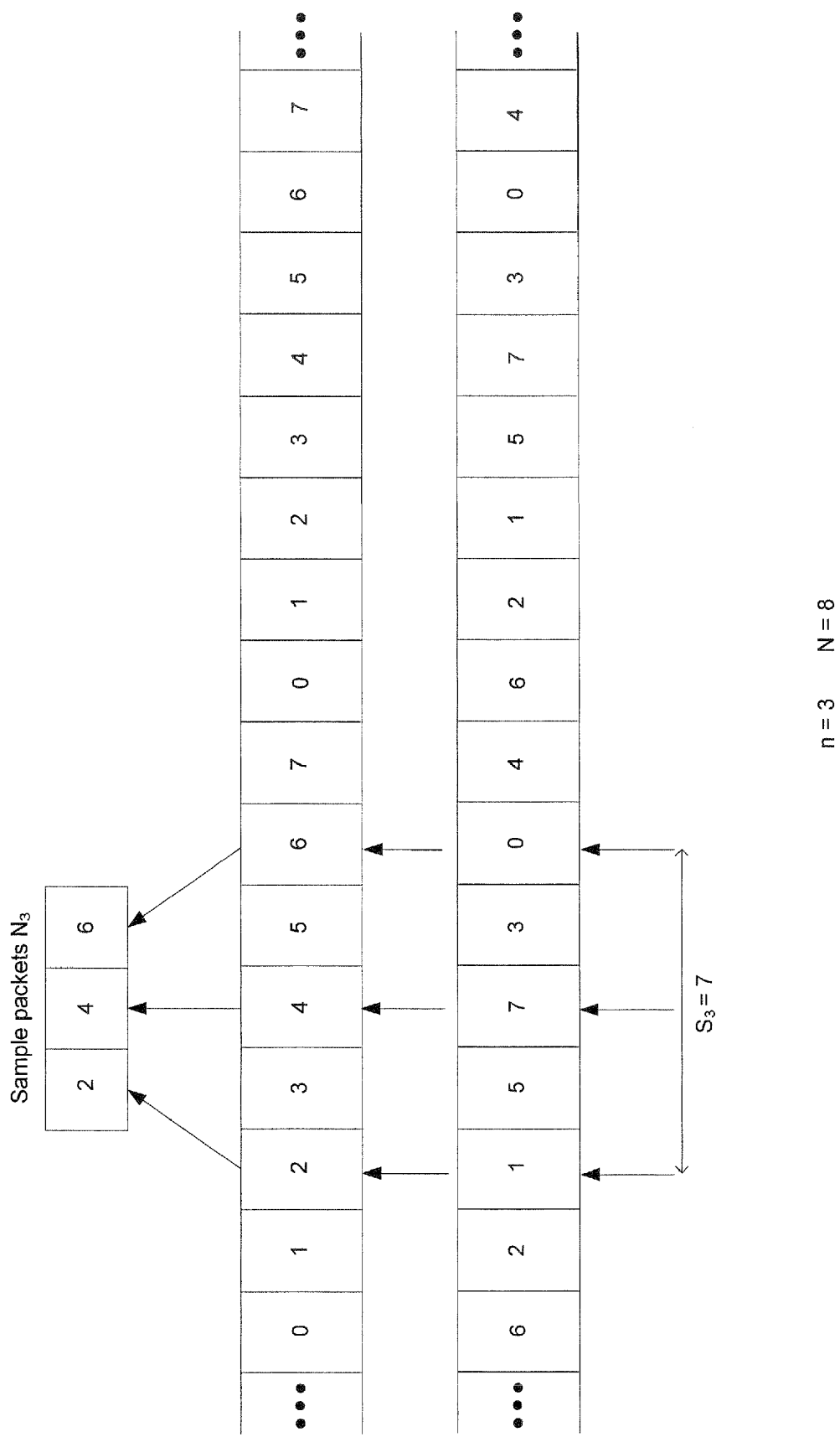
FIG. 6 shows an exemplary pseudo-random n-out-of-N packet sampling with wrap around.

If either of these two criteria is met, then that particular packet is selected for sampling. FIG. 6 shows an exemplary pseudo-random n-out-of-N packet sampling with wrap around. In this example, n is set at three, N is designated at eight, and suppose that the random number generator produces a seven. As before, the standard packet_index sequence is randomly shuffled to generate a randomly shuffled packet_index sequence. Substituting the parameters, the initial equation yields:

7<=randomly shuffled packet_index<=7+3−1 or 7<=randomly shuffled packet_index<=9

Since randomly shuffled packet_index sequence contains only 0 to 7, the only randomly shuffled packet_index which meets this criteria is 7. Substituting the parameters into the second equation yields:

randomly shuffled packet_index<=7+3−1−8 or randomly shuffled packet_index<=1

There are two randomly shuffled packet_index which satisfy this criteria. 0 and 1 satisfy the wrap around condition. Consequently, 0, 1, 7 of randomly shuffled packet_index sequence are identified for sampling purposes. They correspond the seventh, third and fifth packets respectively (i.e., 6, 2, 4 of the standard packet_index sequence). Consequently, in the wrap around condition whereby S=7, the third, fifth and seventh packets are sampled.

Therefore, it can be seen that the sequence of randomly shuffled packet_index {6, 2, 1, 5, 7, 3, 0, 4, etc.} is pseudo-random. As such, the pseudo-random n-out-of-N sampling scheme of the present invention produces a more representative sampling and is much less susceptible to any potential biases. It should be noted that in the embodiment described above, the same shuffled sequence is used for successive sets of N packets. However, in an alternative embodiment, the standard packet_index sequence can be independently shuffled for every N packets. In other words, the shuffled packet_index sequence can either be maintained or reshuffled for every N packets. In either embodiment, the sampling scheme of the present invention produces improved results.

Figure 7:
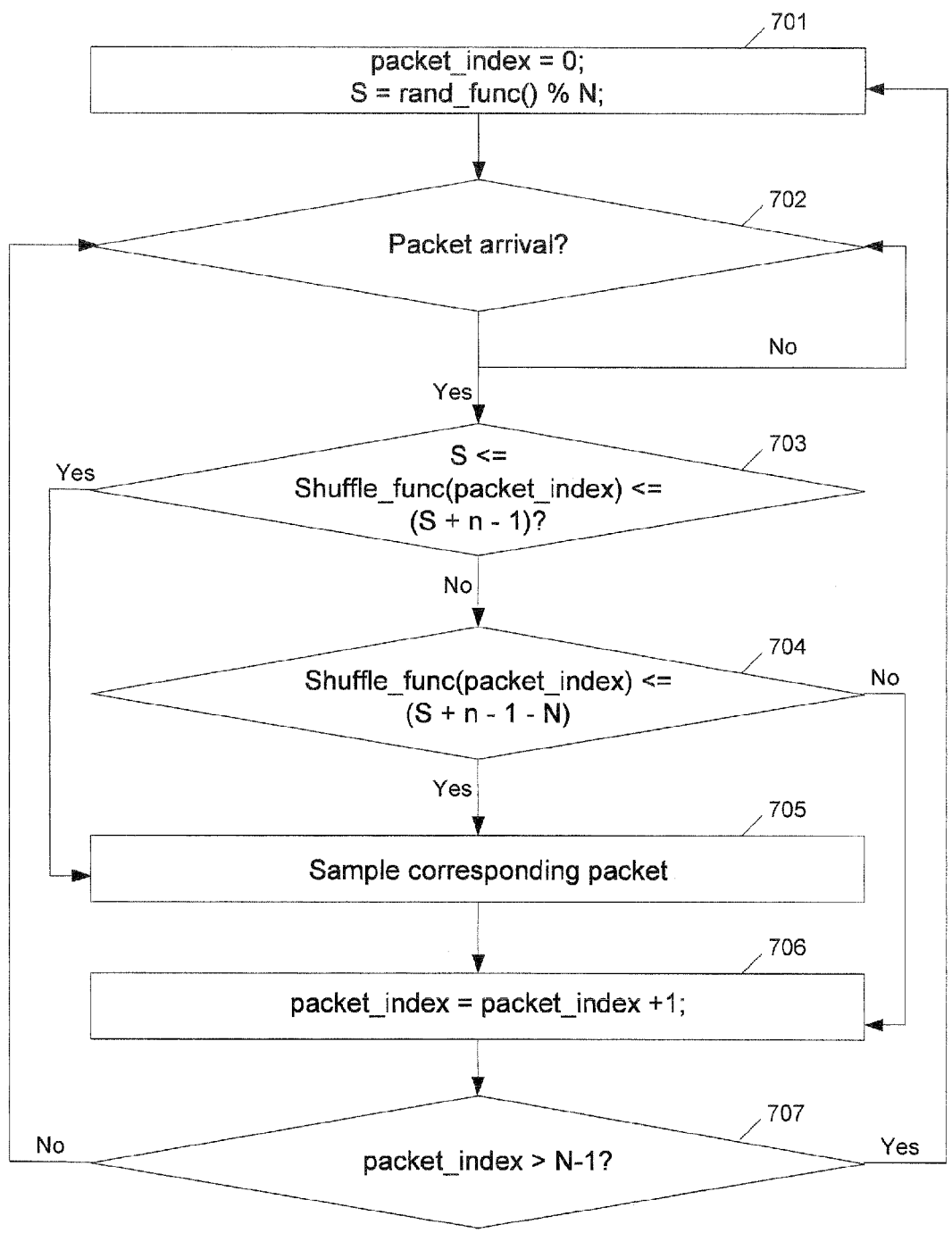
FIG. 7 is a flowchart showing the process of one embodiment of the present invention.

FIG. 7 is a flowchart showing the process of one embodiment of the present invention. The method selects sampling points pseudo-randomly. It is made possible by using a shuffle function, Shuffle_func( ), which rearranges a set of numbers randomly. Given i=0 to N−1 and Y[i]=Shuffle_func(i), each Y[i] contains one of the numbers between 0 to N−1 but there is no two Y[j] and Y[k] values being the same, where j is not equal to k and 0<=j<=N−1 and 0<=k<=N−1. Given the shuffle function, the implementation of n-out-of-N sampling uses some of the same steps as the those of the prior arts. But one difference is that it maps packet_index to another value using shuffle function to determine the sampling points. As a result, sampling points are chosen randomly. In step 701, the packet_index is set to 0, and S is a random_func( ) % N. The packet arrival block 702 awaits a packet arrival. When a packet arrives, decision block 703 determines whether S<=Shuffle_func(packet_index)<=(S+n−1). If this condition is met, the corresponding packet is sampled, step 705. Otherwise, decision block 704 is executed. In decision block 704, a determination is made as to whether Shuffle_func(packet_index)<=(S+n−1−N). If this condition is met, step 705 specifies that this particular packet is to be sampled. Otherwise, if neither condition is met per blocks 703 and 704, the packet is not sampled. Whether the packet is sampled or not, the packet_index is incremented by one, step 706. Lastly, a determination is made as to whether the packet_index>N−1, whereupon the process either repeats at step 701 or step 702. In other words, steps 702-707 repeats every N packets.

Figure 8:
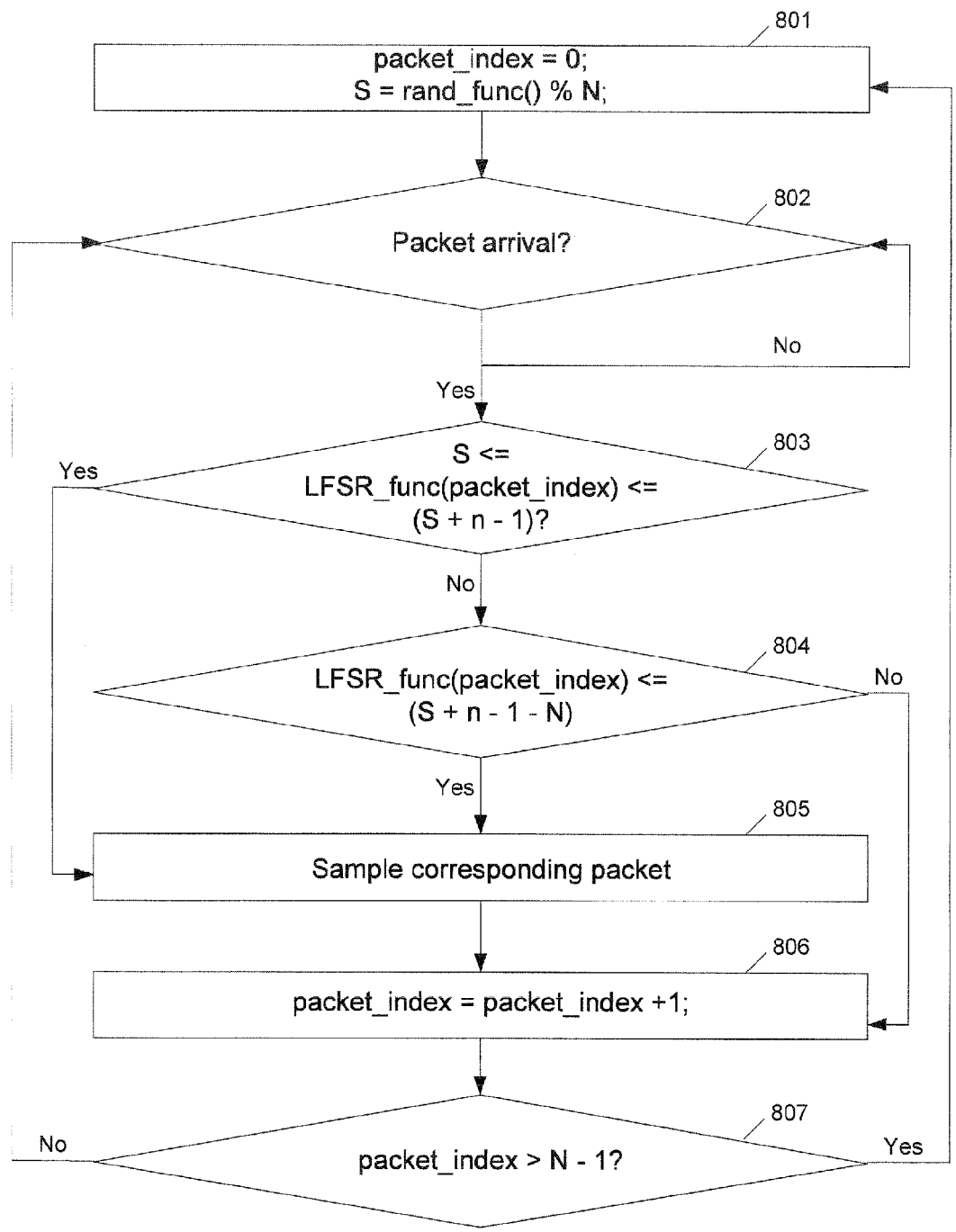
FIG. 8 is a flowchart describing the process in accordance with one embodiment of the present invention where N is a power of two.

FIG. 8 is a flowchart describing the process in accordance with one embodiment of the present invention where N is a power of two. A linear feedback shift register (LFSR) based function can be used to implement the shuffle function. The LFSR can be built either in hardware or in software. It meets all the properties of the shuffle function such as one-to-one pseudo-random shuffling if N is a power of two. The process is essentially the same as depicted in FIG. 7 except that block 803 determines whether S<=LFSR_func(packet_index)<=(S+n−1) and block 804 determines whether LFSR_func(packet_index)<=(S+n−1−N). And although the output of the LFSR function is pseudo-random, it gives very accurate sampling results and provides significant improvements from the prior arts.

In another embodiment of the present invention, N=any positive integer number, can be supported. In this embodiment, the invention introduces two levels of calculation to determine the sampling points. First, N numbers are partitioned into Y number of groups, where Y is the largest power of two which is smaller than or equal to N. Some groups contain one number and some groups contain two numbers. Since number of groups is a power of two, the previous special case of the invention can be used to select n or (N−n) groups out of Y groups. Y is set by users at the beginning of the process.

Second, one of the numbers in each selected group either becomes or does not become a sampling point, depending on the comparison result between n and Y. If (n<=Y), one of the numbers in each selected group is a sampling point. If the selected group contains one number, that number is the sampling point. If the selected group contains two numbers, a random function is used to select one of them to be the sampling point, where rand_func( ) % 2 returns either 0 or 1 randomly.

However, if (n>Y), sampling points are chosen in an opposite way. All numbers are sampling points except one of the numbers in each selected group is not a sampling point. If the selected group contains one number, that number becomes not a sampling point. If the selected group contains two numbers, a random function is used to select one of them not to be the sampling point, where rand_func( ) % 2 returns either 0 or 1 randomly.

The way to decide which group contains two numbers is again using LFSR_func as the shuffle function. X is set randomly at the beginning of every N packets to select (N−Y) number of groups to contain two numbers, (i.e. the group contains two numbers if (X<=LFSR_func(group_index)<=(X+(N−Y)−1)) or (LFSR_func(group_index)<=(X+(N−Y)−1−Y)), where X=rand_func( ) % Y returns a number between 0 and Y−1 randomly).

Figure 9A:
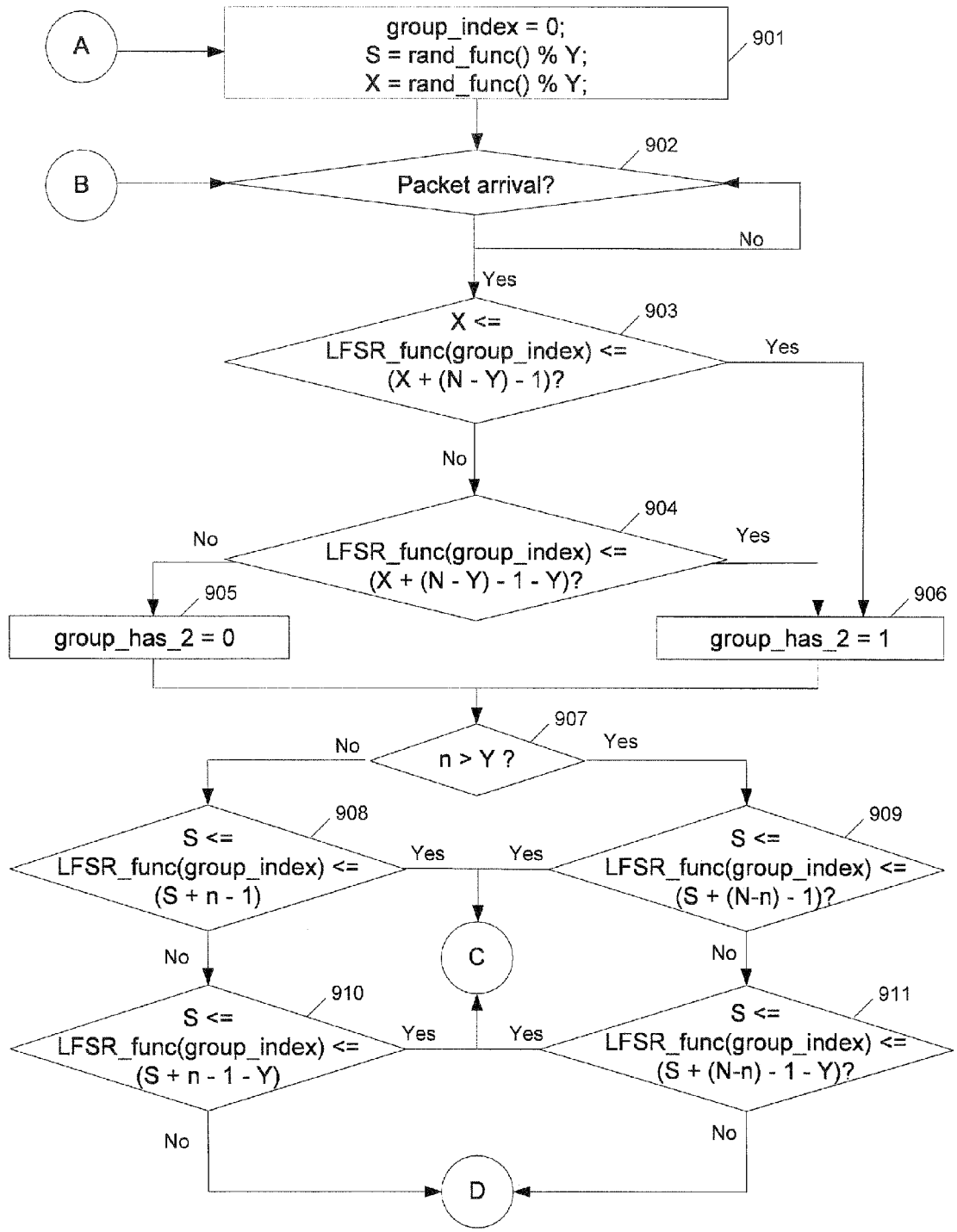
FIGS. 9A-D are flowcharts showing the details of the process according to one embodiment of the invention, where N can be any positive integer value.

FIGS. 9A-D are flowcharts showing the details of the process according to one embodiment of the invention, where N can be any positive integer value. In FIG. 9A, step 901, the group_index is set to 0; S and X are generated as rand_funco % Y. Decision block 902 awaits for a packet to arrive. In decision block 903, a determination is made as to whether X<=LFSR_func(group_index)<=(X+(N−Y)−1). In step 904, a determination is made as to whether LFSR_func(group_index)<=(X+(N−Y)−1−Y). If either of these two conditions in steps 903 and 904 is met, then the group_has_2 variable is set to 1 in step 906. In other words, the group is chosen to have 2 numbers. Otherwise, the group_has_2 variable is set to 0 in step 905. Hence, the group is chosen to have 1 number.

Next, step 907 determines whether n>Y. If n is not greater than Y, steps 908 and/or 910 are executed. Step 908 makes a determination as to whether S<=LFSRfunc(group_index)<=(S+n−1). Step 910 determines whether LFSR_func(group_index)<=(S+n−1−Y). If either of these two conditions is met, the process continues to "C." It means one of the number(s) in the group is going to become a sampling point. However, if neither of the two conditions set forth in steps 908 and 910 are met, the process proceeds to "D." None of the number(s) in the group is going to become a sampling point.

On the other hand, if n is greater than Y, sampling points are chosen in an opposite way. It means all numbers are sampling points except one of the number(s) in (N−n)

groups will not become a sampling point. Steps 909 and/or 911 are executed. Step 909 determines whether S<=LFSRfunc(group_index)<=(S+(N−n)−1). Step 911 determines whether LFSRfunc(group_index)<=(S+(N−n)−1−Y). If either of the two conditions in steps 909 and 911 is met, the process continues to "C." In other words, one of the number(s) in the group will not become a sampling point. However, if neither of the two conditions are met, the process proceeds to "D." All number(s) in the group will maintain as sampling point(s).

Figure 9B:
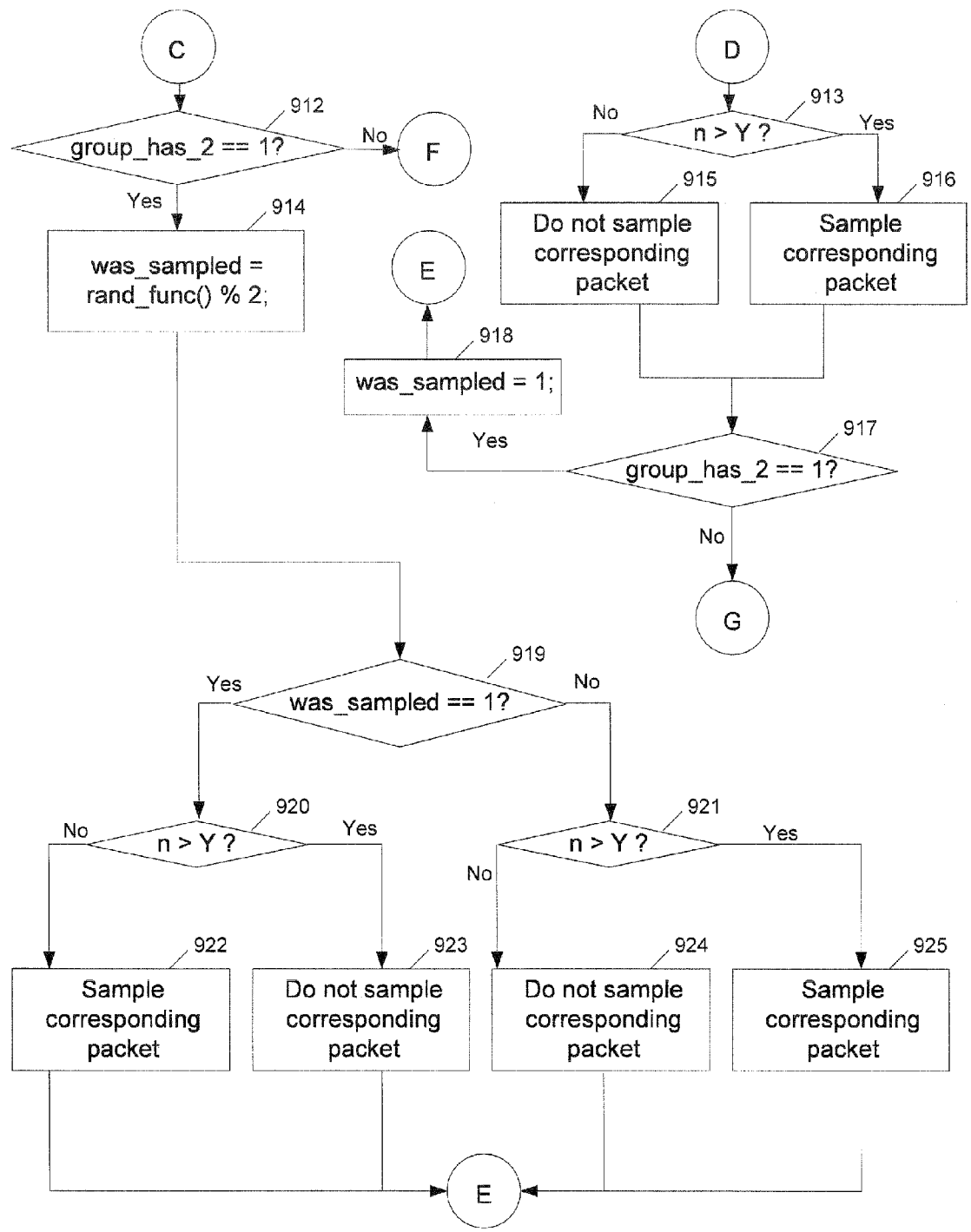

Referring to FIG. 9B, step 912 of the "C" path determines whether the group_has_2 variable has been set to 1. If it has not been set to 1, the group only has one number. That number is selected and the process continues to "F". Otherwise, step 914 sets the variable was_sampled to a rand_func( )% 2. The variable was_sampled is used to select one of the two numbers in the group. If it is equal to 1, it selects the first number of the group. Otherwise, it selects the second number of the group. A determination is then made in step 919 as to whether was_sampled equal to 1. If it is set to 1, the corresponding packet is sampled, step 922, provided that n is not greater than Y (see step 920). But if n is greater than Y, determined by step 920, then the corresponding packet is not sampled, step 923. The reverse is true for those instances when the was sampled variable is not set to 1. In these instances, if n is not greater than Y (see step 921), the corresponding packet is not sampled, step 924. Otherwise, if n is greater than Y, the corresponding packet is sampled, step 925. Steps 922, 923, 924, and 925 all continue to "E." "E" is an additional path to continue for the second number of the group.

Referring still to FIG. 9B, step 913 of the "D" path determines whether n is greater than Y. The first outcome, step 915, does not sample the corresponding packet if n is not greater than Y, as determined by step 913. The second outcome, step 916, samples the corresponding packet whenever n is greater than Y, as determined by step 913. Step 917 determines whether the variable group_has_2 is set to 1. If it is true, it means the group has two numbers. Step 918 sets was_sampled to 1 so that "E" path will not select the second number of the group. If step 917 determines the variable group_has_2 is equal to 0, it means the group only has one number. The process proceeds to "G" to advance to the next group_index.

Figure 9C:
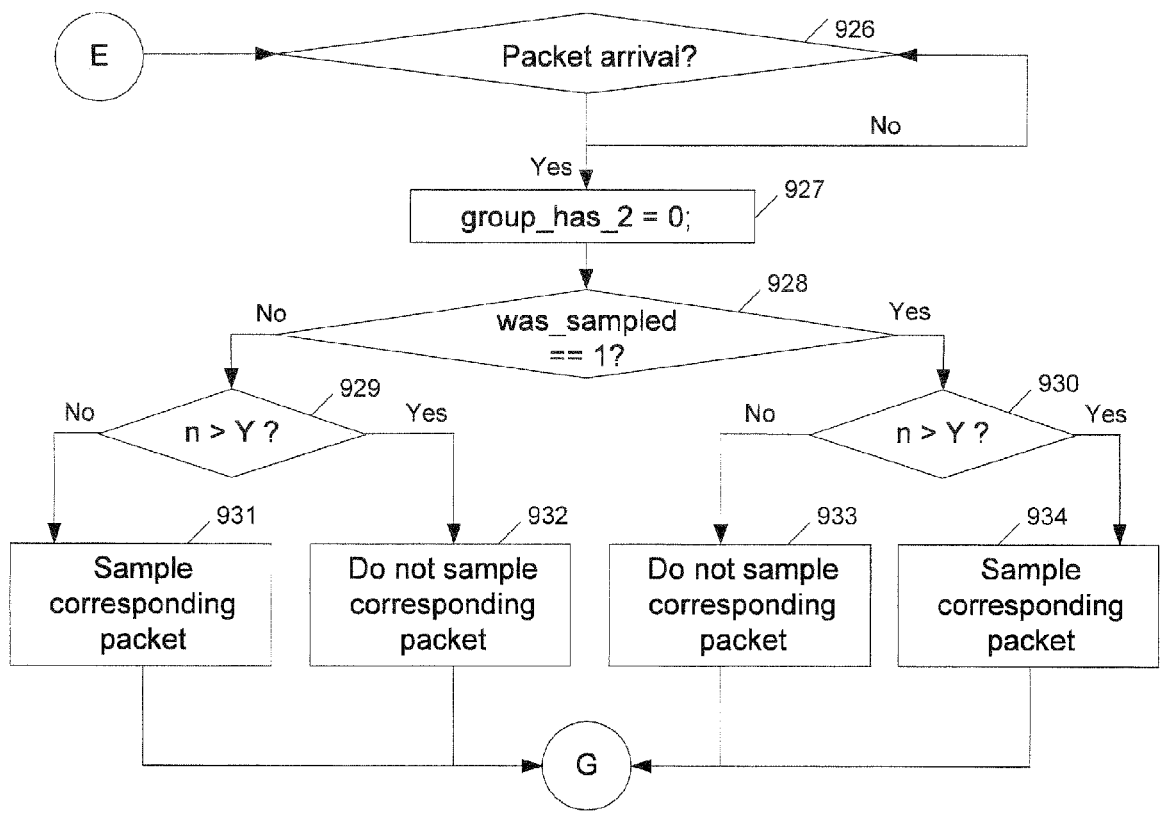

Referring now to FIG. 9C, step 926 of the "E" path awaits for a packet arrival. Upon packet arrival, step 927 sets group_has_2 to 0. It is because the process of this group is done. It needs to clear the variable group_has_2. Thereupon, steps 928-934 are equivalent to steps 919-925, and the process proceeds to "G" to advance to the next group_index.

Figure 9D:
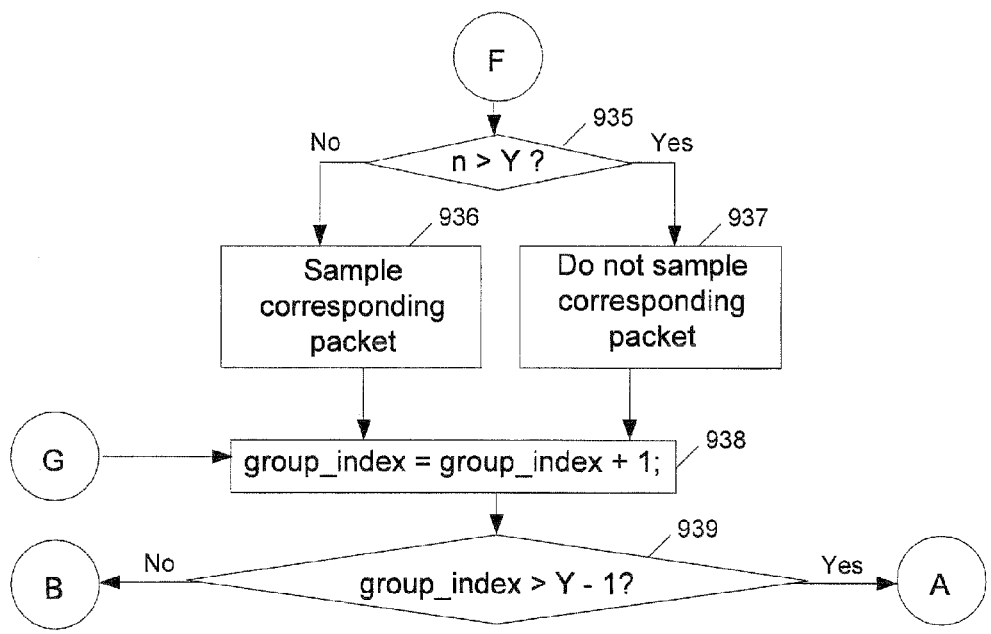

Finally, in FIG. 9D, the process flow of "F" leads to decision block 935. Decision block 935 determines whether n is greater than Y. If n is not greater than Y, the corresponding packet is sampled according to step 936. Otherwise, step 937 causes the corresponding packet to not be sampled. The process then increments the group_index by one in step 938. Step 938 is also the point for continuing the "G" process flow. In the last step 939, a determination is made as to whether the group_index is greater than (Y−1). if it is not greater, the process proceeds to "B"; otherwise, the process proceeds to "A". The "A" flow starts with step 901. The "B" flow starts with step 902. If the process proceeds to "A", it means steps 902-939 have been repeated Y times.

In summary, embodiments of the invention describe a simple way to select n out of N packets pseudo-randomly by using the shuffle function. The LFSR based function is one example of a shuffle function because it meets all the requirements of the shuffle function and it can be easily implemented in either hardware or software. Although the LFSR function has a property to only support N when it is a power of two, other embodiments of the invention explain a way to support N being any positive integer number. N numbers are first partitioned into Y groups, where Y is the largest power of two which is smaller than or equal to N. The LFSR function then can be used to select n or (N−n) groups. One of the numbers in each selected group either becomes or not to become a sampling point depending on the comparison result between n and Y. As a result, n out of N packets are selected pseudo-randomly. It should be noted that the present invention is not limited to any specific implementation of rand_func( ). The rand_func( ) can be done by using a free-running regular counter or LFSR counter, or any pseudo-random generation. As long as it is operating independent to the packet arrival events, it does not affect the quality of the sampling.

Thus, a pseudo random n-out-of-N sampling scheme has been disclosed. It should be noted that the present invention is not limited to packet sampling or networking. The present invention is applicable to any and all sampling schemes where it would be beneficial to minimize biasing. It should be further noted that the foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for sampling packets in a network, comprising:
   determining a first number of packets n to be sampled from a second number of packets N using a linear feedback shift register, wherein said second number of packets is any positive integer;
   partitioning said second number of packets N into a plurality of Y groups, each group being comprised of a single number or two numbers, said plurality of Y groups being equal to a largest power of two which is smaller than or equal to said second number of packets N; and
   comparing said first number of packets n to said plurality of Y groups, wherein if said first number of packets n is less than or equal to said plurality of Y groups, selecting a sampling point from each group to be one of (a) said single number and (b) a number randomly selected from said two numbers.

2. The method of claim 1, wherein if said first number of packets n is greater than said plurality of Y groups, selecting all numbers from each group to be sampling points except one of (a) said single number and (b) said number randomly selected from said two numbers.

3. The method of claim 1 further comprising determining which of said plurality of Y groups contains said two numbers, wherein determining comprises:

taking a difference between said second number of packets N and said plurality of Y groups to determine a total of groups containing said two numbers;

randomly selecting a number X between zero and Y−1;

comparing said randomly selected number X, said second number of packets N, and said plurality of Y groups to determine which of said plurality of Y groups contains said two numbers; and selecting said sampling point responsive to said comparing.

4. An apparatus for sampling packets comprising:

a first packet index sequence comprising a plurality of N packets ordered sequentially;

a randomly shuffled packet index sequence comprising said plurality of N packets, wherein said randomly shuffled packet index sequence comprises each of said N packets of said first packet index sequence in a randomly shuffled order, and wherein each packet index of said randomly shuffled packet index sequence corresponds to a different packet index of said first packet index sequence, and a circuit structured to randomly select a number S which is less than or equal to N and to sample a plurality of n packets from said plurality of N packets responsive to said randomly selected number S.

5. The apparatus of claim 4, wherein if S is less than or equal to one packet index of said randomly shuffled packet index sequence, and said one packet index is less than or equal to (S+n−1), said circuit is structured to sample a packet corresponding to said one packet index.

6. The apparatus of claim 5, wherein said circuit is structured to detect a wrap condition if said one packet index is less than or equal to (S+n−1−N).

7. The apparatus of claim 6, wherein said circuit is structured to sample said packet corresponding to said one packet index responsive to detecting said wrap condition.

8. The apparatus of claim 4, wherein said randomly shuffled packet index sequence is used for successive sets of N packets.

9. The apparatus of claim 4, wherein said randomly shuffled packet index sequence is reshuffled for every N packets.

10. The apparatus of claim 4, wherein said randomly shuffled packet index sequence is shuffled using a linear feedback shift register, and wherein N is a power of two.

11. An article of computer readable media storing computer executable instructions which cause the computer to:

determine a first number of packets n to be sampled from a second number of packets N using a linear feedback shift register, wherein said second number of packets is any positive integer;

partition said second number of packets N into a plurality of Y groups, each group being comprised of a single number or two numbers, said plurality of Y groups being equal to a largest power of two which is smaller than or equal to said second number of packets N; and compare said first number of packets n to said plurality of Y groups, wherein if said first number of packets n is less than or equal to said plurality of Y groups, causing the computer to select a sampling point from each group to be one of (a) said single number and (b) a number randomly selected from said two numbers.

12. The article of computer readable media of claim 11, wherein if said first number of packets n is greater than said plurality of Y groups, causing the computer to select all numbers from each group to be sampling points except one of (a) said single number and (b) said number randomly selected from said two numbers.

13. The article of computer readable media of claim 11 further causing the computer to determine which of said plurality of Y groups contains said two numbers, wherein causing the computer to determine includes causing the computer to:

take a difference between said second number of packets N and said plurality of Y groups to determine a total of groups containing said two numbers;

randomly select a number X between zero and Y−1;

compare said randomly selected number X, said second number of packets N, and said plurality of Y groups to determine which of said plurality of Y groups contains said two numbers; and select said sampling point responsive to said comparing.

* * * * *